United States Patent [19]

Kloppenburg et al.

[11] Patent Number: 5,786,013
[45] Date of Patent: Jul. 28, 1998

[54] METHOD AND APPARATUS FOR OPENING AND CLOSING BAKING MOLDS FOR USE IN A CONTINUOUS OVEN

[75] Inventors: Wiebe Kloppenburg, Deventer; Johan Hendrik Adolf Arentsen, Lochem, both of Netherlands

[73] Assignee: Suntray B.V., Netherlands

[21] Appl. No.: 569,110

[22] PCT Filed: Apr. 18, 1995

[86] PCT No.: PCT/NL95/00139
§ 371 Date: Mar. 8, 1996
§ 102(e) Date: Mar. 8, 1996

[87] PCT Pub. No.: WO95/28086
PCT Pub. Date: Oct. 26, 1995

[30] Foreign Application Priority Data

Apr. 18, 1994 [NL] Netherlands ............... 9400619

[51] Int. Cl.[6] .................................................. A21B 5/00
[52] U.S. Cl. ........................... 426/233; 426/231; 99/353; 99/427
[58] Field of Search ................... 426/233, 231; 99/353, 427

[56] References Cited

U.S. PATENT DOCUMENTS 5,016,528  5/1991  Chen ........................... 99/353

*Primary Examiner*—Deborah Yee
*Attorney, Agent, or Firm*—Michaelson & Wallace; Peter L. Michaelson; John C. Pokotylo

[57] ABSTRACT

A baking oven for baking material held in two-piece baking molds and including a closing station and a removal station. The closing station includes controlled activating members for closing a two-piece baking mold. Once closed, the two-piece baking mold is locked. The removal station includes controlled activating members for allowing the two-piece baking mold to be unlocked and opened.

26 Claims, 4 Drawing Sheets 5,786,013

METHOD AND APPARATUS FOR OPENING AND CLOSING BAKING MOLDS FOR USE IN A CONTINUOUS OVEN

BACKGROUND OF THE INVENTION

The invention relates to a method for manufacturing products in a series of baking molds to be passed through an oven. The baking molds comprise at least two baking sections movable relative to each other. In a baking cycle, the baking mold is successively opened, filled, closed and locked in a closing station, guided along a number of guideways extending through the oven, and opened and emptied in a removal station. Such a method is known from German Offenlegungsschrift (laid open provisional publication) number 39 34 881.

In the known method, a series of baking molds linked through chains are passed through an oven. Each baking mold is filled with an amount of dough in a filling station, passed on to a closing station where it is closed and locked, passed through a baking zone where the dough is baked and then guided into a removal station where the baking mold is unlocked and opened and the baked product is removed from the baking mold. Then the baking mold is guided into the filling station again in opened condition.

For closing the baking molds, closure guiding means are stationarily arranged in the path of travel of the series of baking molds, such that the baking molds can be guided between and through them. The position of the closure guiding means is such that the sections of the baking mold are thereby pressed into the closed position when a baking mold is pulled between and through the closure guiding means by means of the chain, so that a lock can be provided. The closure guiding means accordingly constitute a fyke net of fixed shape and fixed position. After the baking mold is locked and the product is baked, the lock is broken in the removal station and the baking mold is automatically opened, with a section of the baking mold swinging away. For opening the baking mold, gravity, inter alia, is used, with the swinging section being provided with a guide roller which runs through a stationarily arranged guide rail to limit the swinging motion. Then the baked product is removed from the baking mold.

In this known method, the movements of the mold sections relative to each other are caused, on the one hand, by stationary operating means, such as the closure guiding means and the guide rail, and, on the other hand, by gravity and tension built up in the mold during closure and baking of the product. Since the operating means are arranged stationarily, the movements of the mold sections cannot be accurately controlled and the forces occurring in the process cannot be dosed. This may cause large, highly varying loads.

The force applied to the mold by the closure guiding means will always be inversely proportional to the fixed distance between the closure guiding means and the thickness of the mold in the closed condition. If, for instance, a mold has become thinner through wear, the force exerted thereon by the closure guiding means will be smaller than in the case of a new, thicker mold. If, on the other hand, a mold, for instance as a result of soiling of the land areas, is thicker in the closed condition than is normal, the force applied will be greater. A greater force causes the driving chain to exert a greater pulling force on the mold in order to pass the mold through the fyke, which will cause greater wear of the driving chain and the driving means. Moreover, if the closure guiding means are required to produce a greater force, these means and the mold will be subject to greater wear.

When the thickness of the mold, when being fed to the closure guiding means, is extremely large, for instance because the mold before being filled with dough was emptied incompletely or not at all, the baking mold cannot be moved through the fyke. Consequently, the mold, the closure guiding means or the chain are damaged and the oven comes to a halt. When the oven is at a standstill, at least the baking molds and products present in the oven will burn, causing substantial economic damage.

If the mold is thinner than is normal, the mold is not pressed shut to a sufficient extent by the closure guiding means. Consequently, the locking of the baking mold is adversely affected and wear of the locking means is increased or the locking means may even break. If the locking means breaks, as in the case of improper locking, the baking mold will open in the oven, thereby causing the series of baking molds to jam in the oven and the baking molds and products to burn as a result. In the case of substantial wear of the locking means, the closure of the baking molds is insufficient, so that the quality of the baked products is adversely affected.

Differences in thickness of the mold moreover occur when the molds used are replaced by molds for other products.

As the products are baked in the oven, pressure builds up in the baking mold in that moisture evaporates from the dough and the volume of the dough increases. Also, during the closure of the baking mold, biases in the closing direction can occur in the baking mold. As a result, the locking provision is loaded considerably. Accordingly, unlocking the baking mold requires a relatively great deal of effort, giving rise to wear of the locking means as well as to additional loading and wear of the driving chain. After the baking mold is unlocked, the hinging section thereof will be pushed away quickly and forcibly by the pressure built up, the tension released, and by gravity, giving rise to a large and uncontrolled load on at least the guide roller, the statically arranged guide rail and the mold sections. This may cause the guide roller to become damaged or broken off in which case the baking mold is distorted and can no longer be closed in a next cycle, with all adverse consequences thereof.

SUMMARY OF THE INVENTION

The object of the invention is to provide a method of manufacturing products in a series of baking molds to be passed through an oven. The molds include two sections movable with respect to each other. In a baking cycle, the mold is (i) opened, (ii) filled, (iii) closed and locked, (iv) guided through the oven on a number of guideways, and (v) opened and emptied at a removal station. An object of the present invention is to avoid the disadvantages mentioned but retain the advantages. To that end, the method according to the invention is characterized in that at least a part of the movements of the baking sections relative to each other are controlled by actuator means movable relative to the baking mold under active control, which, for controlling the movements of the baking sections relative to each other, transmit to the baking sections a force which is directed in the closing direction.

Since the actuator means are movably arranged relative to the baking molds, variations in the thickness of the molds can be simply accommodated. Moreover, the actuator means can be positioned relative to the mold such that, at any time, precisely the desired force is transmitted to the mold, both with regard to the movements of the different mold sections relative to each other and with regard to the movements of the mold in the oven. As a result, the movements of the mold sections can be well controlled and the forces arising can be accurately controlled, so that the load on and wear of the different oven parts and mold parts is minimal, regardless of the molds used. Moreover, it is thus ensured that the closure and locking of the baking molds is always optimal, so that the products always meet the quality requirements set. Unlike the stationarily arranged operating means, the movable actuator means accordingly have the advantage that the mold sections are moved under active control by the actuator means.

The occurrent tensions and loads, and particularly the variations therein, are largest when using relatively cold molds, which cannot yet be used for baking products. In the known method, these molds are also passed through the oven while they are in cold condition, and each time opened, closed, locked and unlocked. This causes substantial loads on and wear of the different parts. In a particularly advantageous embodiment of the method according to the invention, the baking molds are therefore preheated in the oven before being used for baking the moldings, the baking molds being closed and locked and then passed through the oven a number of times in succession without being unlocked or opened. During the heating of the baking molds, the actuator means are preferably moved out of the path of movement of the baking molds. For that matter, in some cases, during the heating of the oven and the baking molds, the baking molds may also be circulated a number of times in comparable manner while unlocked.

The invention further relates to an oven comprising a series of baking molds to be passed in succession through the oven, which oven comprises at least a closing station, a removal station and a baking zone. Each baking mold includes a first and a second baking section. The first baking section includes guide means by which the baking mold can be guided along a number of guideways extending through the oven, actuator means being provided for pressing the mold sections in the closing direction, locking means and lock operating means arranged for locking and unlocking the baking mold. According to the invention, the actuator means comprise a first actuator comprising closing pressure means and closure support means movable relative to each other between a first position wherein the baking mold can be moved substantially freely between and through the closing pressure means and the closure support means, and a second position wherein the baking mold in the closed condition, before being locked, is or can be brought into contact, under a closing bias, simultaneously with the closing pressure means and the closure support means.

Upon movement of the closing pressure means and the closure support means into the first position, the baking mold can be moved therebetween by simply moving forward the series of baking molds, without this requiring any additional force. Here the actuator means do not exert any force on the baking mold. After the baking mold has been moved between the closing pressure means and the closure support means, these are moved into the second position. Here such a force in the closing direction is exerted on the mold sections that the locking means can be simply operated without involving any wear. After the baking mold is locked, the closing pressure means and the closure support means are preferably moved back in the direction of the first position, whereafter the baking mold can be moved freely from between them.

In a preferred embodiment of the oven according to the invention, the actuator means moreover comprise a second actuator comprising removal pressure means and removal support means. The removal pressure and support means are movable relative to each other between first and second positions. In the first position, the baking mold can be moved substantially freely between and through the removal pressure means and the removal support means. In the second position, the baking mold in closed condition, before being unlocked, is or can be brought into contact simultaneously with the demolding pressure means and the removal support means, biassed in a closing direction, with means being included for the controlled opening of the baking mold after unlocking. The second actuator means are preferably included directly before or in the removal station.

Since the removal pressure means and the removal support means are movable into a first position wherein the baking mold can be moved freely between them, no additional stresses arise upon forward travel of the mold in the removal station. Only when the baking mold has been moved between the removal pressure means and the removal support means are these moved into the second position, where the actuator exerts a force on the baking mold in the closing direction, such that the baking mold is pressed shut to a slightly further extent. As a result, the baking mold can be simply unlocked without being opened directly or springing open. Only upon the gradual retraction of the removal pressure means and the removal support means to the first position is the baking mold opened in a controlled manner; the actuator decelerates the motion of the swinging section, thereby preventing the occurrence of large loads, at least large impact loads.

The invention further relates to an actuator for controlling movements of mold sections relative to each other in a travelling-tray oven. The actuator includes at least one pressure roller, at least one support roller, and control means. The support roller and the pressure roller are arranged above each other, have approximately parallel axes of rotation and are movable relative to each other in a direction approximately at right angles to the axes of rotation. The control means includes at least location detection means, position detection means, a force transmitting device and force detection means. The location detection means are arranged for determining the position of a baking mold relative to the actuator. The position detection means are arranged for determining the position of the pressure roller relative to the support roller. The force transmission device is arranged for the controlled movement of the pressure roller and the support roller relative to each other. The force detection means are arranged for determining the magnitude of the forces transmitted by the actuator to the baking mold.

The actuator according to the invention makes it possible, both during the closing and the opening of the baking mold, to optimally actuate and control the movements of the different mold sections relative to each other. Moreover, with an actuator according to the invention, it is possible to set a maximum closing force that can be produced by the force transmission device. This prevents too large a closing force from being exerted on a baking mold. The actuator is preferably arranged such that when the set maximum closing force is exceeded, the locking means are switched off, so that damage to the locking means, the mold or the oven is prevented.

BRIEF DESCRIPTION OF THE DRAWINGS

To clarify the invention, exemplary embodiments of a method and an apparatus will be described with reference to the drawings.

DETAILED DESCRIPTION

Figure 1:
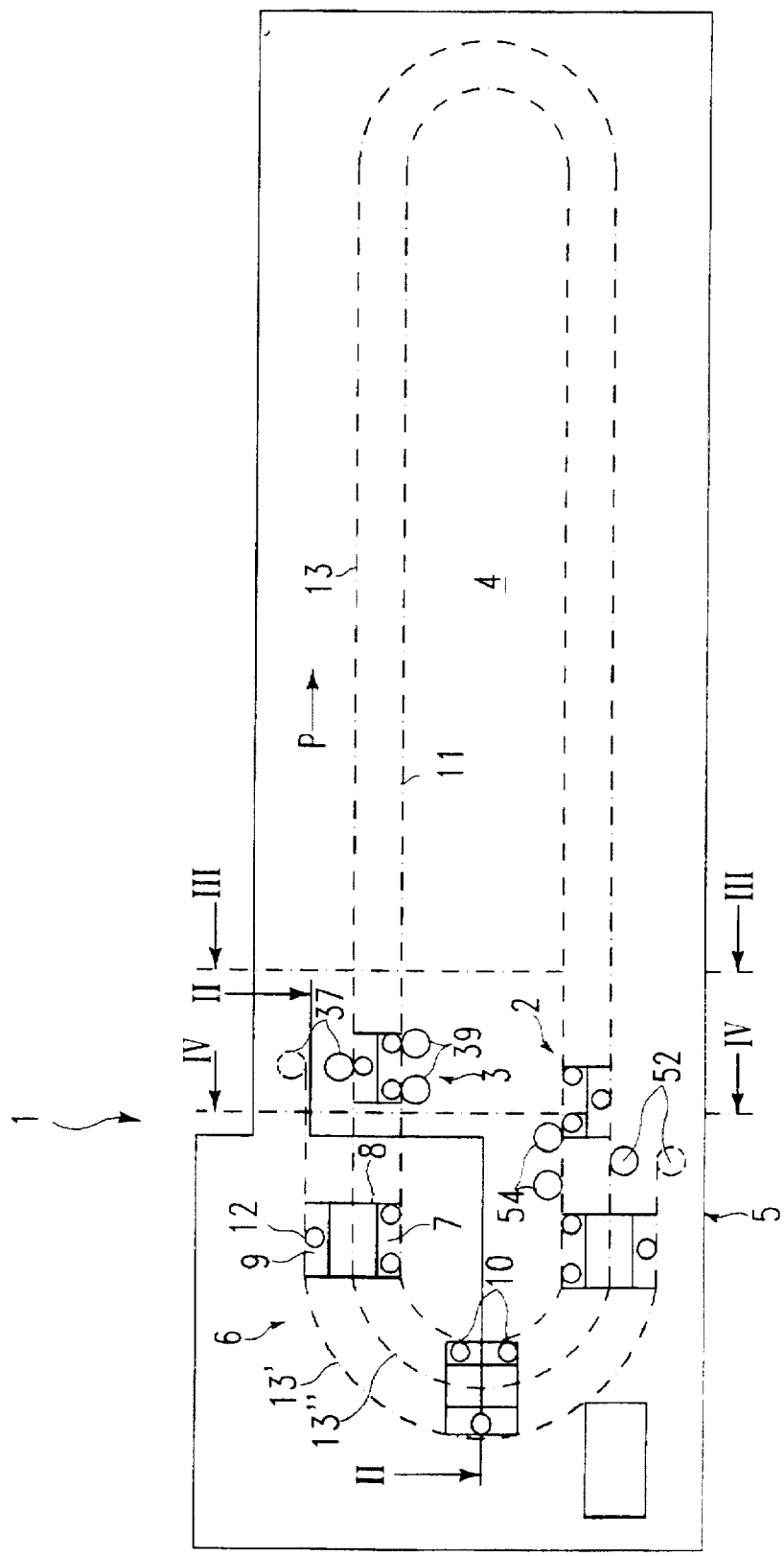
FIG. 1 diagrammatically shows, in front view, an oven according to the invention, partly in cross section.

FIG. 1 diagrammatically shows, in partly sectional side elevation, a travelling-tray oven 1 suitable for baking dish parts or like moldings in a number of linked baking molds 2. In the oven 1, the baking molds 2 are circulated in the direction indicated by the arrow P, the baking molds 2 being successively passed through a closing station 3 (FIG. 2, right; FIG. 3), a baking zone 4, a removal station 5 (FIG. 2, left; FIG. 4), a filling station 6 and back again to the closing station 3.

Figure 5:
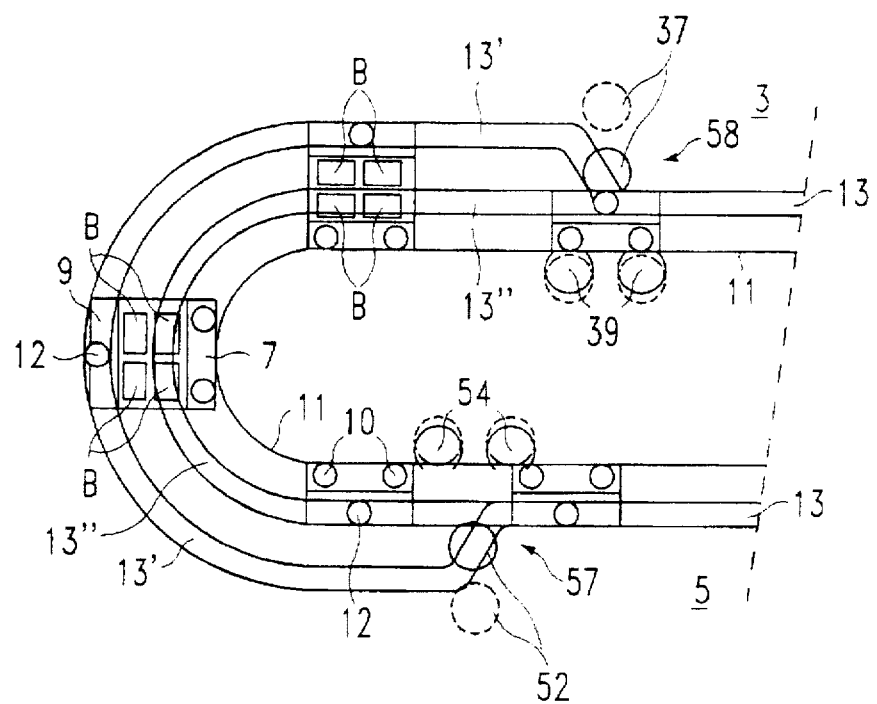
FIG. 5 diagrammatically shows, in front view, a guide rail, comprising a switch, together with an opened and a closed baking mold.

Each baking mold 2 is made up of a first mold section 7 and a second mold section 9 hingedly connected thereto along a hinge 8. The hinge 8 extends along one of the sides of the two mold sections 7, 9. In the closed position of the baking mold 2, the mold sections 7, 9 together form one or more baking forms B (FIG. 5). The first mold section 7 comprises runners 10 by which the baking mold 2 can be guided over a pair of track rails 11 extending through the oven. The second mold section 9 comprises, on the side remote from the hinge 8, a guide roller 12 which can be guided by a guide rail 13 likewise extending through the oven.

Figure 6:
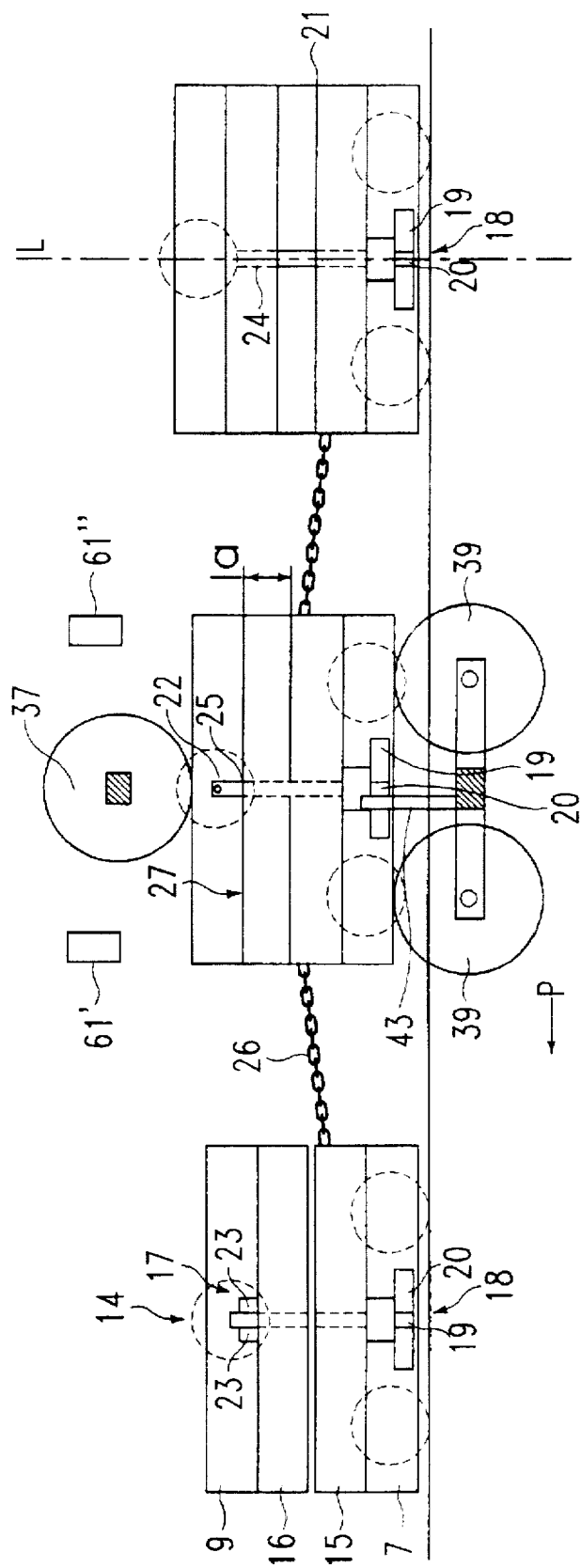
FIG. 6 diagrammatically shows, in side elevation, three baking molds, in three successive stages of locking.

Each baking mold 2 further comprises a locking mechanism 14, of which one exemplary embodiment is depicted in FIG. 6. The first mold section 7 comprises, on the side remote from the hinge 8, a first flange 15 and the second mold section 9 comprises, on the side remote from the hinge 8, a second flange 16. In the closed condition of the baking mold, the first flange 15 and the second flange 16 are disposed against each other. Through the first flange 15 extends a locking pin 17 which can only rotate about its longitudinal axis L. At the lower end, under the first flange 15, the locking pin comprises a cross 18 consisting of two legs 19 and 20 extending perpendicularly to the longitudinal axis L and to each other. At the upper end, the locking pin 17, at a distance a from the top 21 of the first flange 15, comprises a locking face 22 extending parallel to the longitudinal axis L of the locking pin. The locking face 22 has a thickness which is less than the thickness of the locking pin 17, and has two opposite sides 23 projecting outside the locking pin 17.

The second flange 16 comprises a through opening 24 whose cross section corresponds substantially with the cross section of the locking pin 17, taken through the locking face 22 and at right angles to the longitudinal axis L. In the closed condition of the baking mold 2, the upper end of the locking pin 17 is receivable in the opening 24, the locking face 22 extending outside the side of the second flange 16 remote from the first flange 15. The lower end 25 of the locking face 22 is then substantially level with the top surface 27 of the second flange 16.

By rotating the locking pin 17, it can be brought into a first position wherein the locking face 22, in the closed position of the mold 2, extends entirely above the opening 24 within the contours thereof, and a second position wherein the locking face 22 extends substantially outside the contours of the opening 24. The first position is the unlocking position because the second mold section 9 can then be moved relative to the first mold section 7. The second position is the locking position since then the two mold sections are locked relative to each other.

As shown in FIG. 6, the baking molds are linked, for instance by a driving chain 26. The driving chain 26 is driven in a generally known manner by a driving mechanism, not shown in the drawing, whereby the baking molds 2 are pulled through the oven 1.

A baking mold 2 is supplied in opened condition to the filling station 6, where an amount of dough is placed in the baking mold. The guide roller 12 then runs through a first part 13' of the guide rail 13, arranged at a relatively large distance from the track rails 11. Thereafter, the baking mold is passed to the closing station 3, with the second mold section 9 being pivoted in the direction of the first mold section 7. The first part 13' of the guide rail 13 is bent between the filling station 6 and the closing station 3 in the direction of the track rails 11, and the guide rail 13 extends from the closing station parallel to the track rails 11 through the baking zone 4. In the closing station 3 the baking mold is pressed shut and locked.

Figure 2:
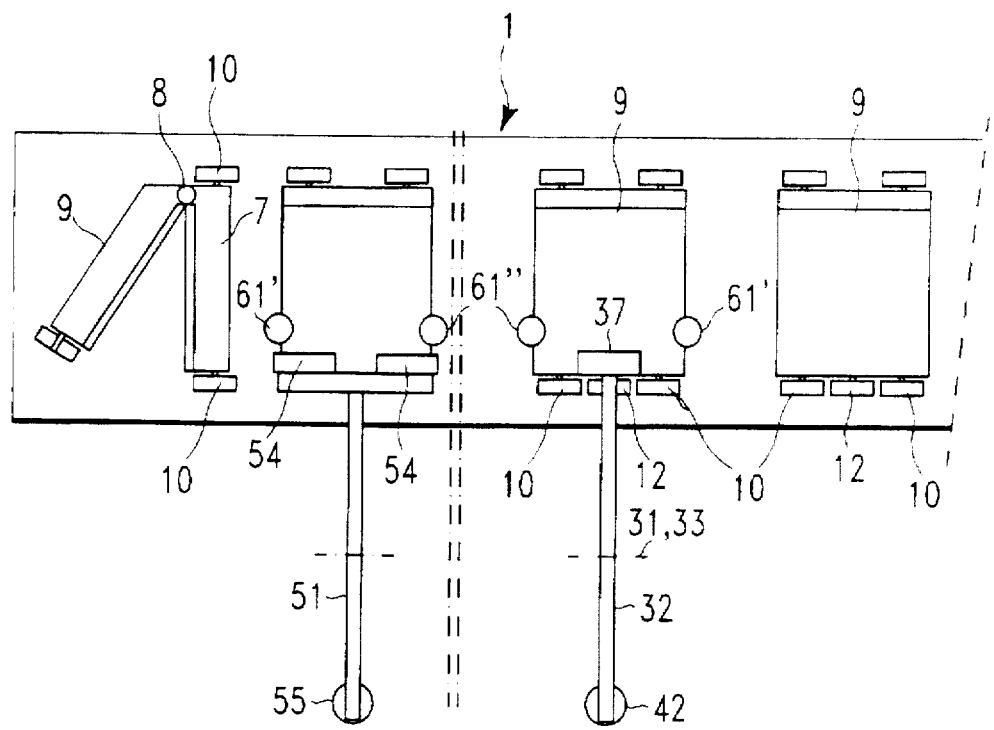
FIG. 2 diagrammatically shows, in cross section, taken on the line II—II in FIG. 1, a part of the oven comprising a closing station, a removal station and a number of baking molds.
Figure 3:
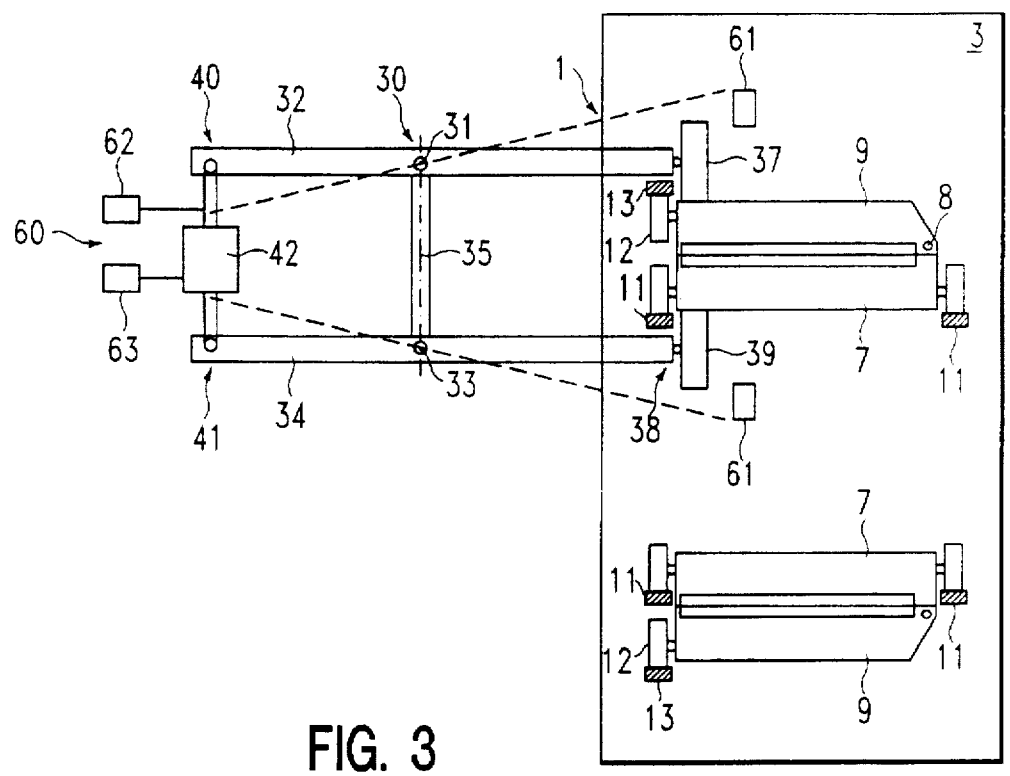
FIG. 3 diagrammatically shows, in cross section, taken on the line III—III in FIG. 1, a closing station with a baking mold.
Figure 4:
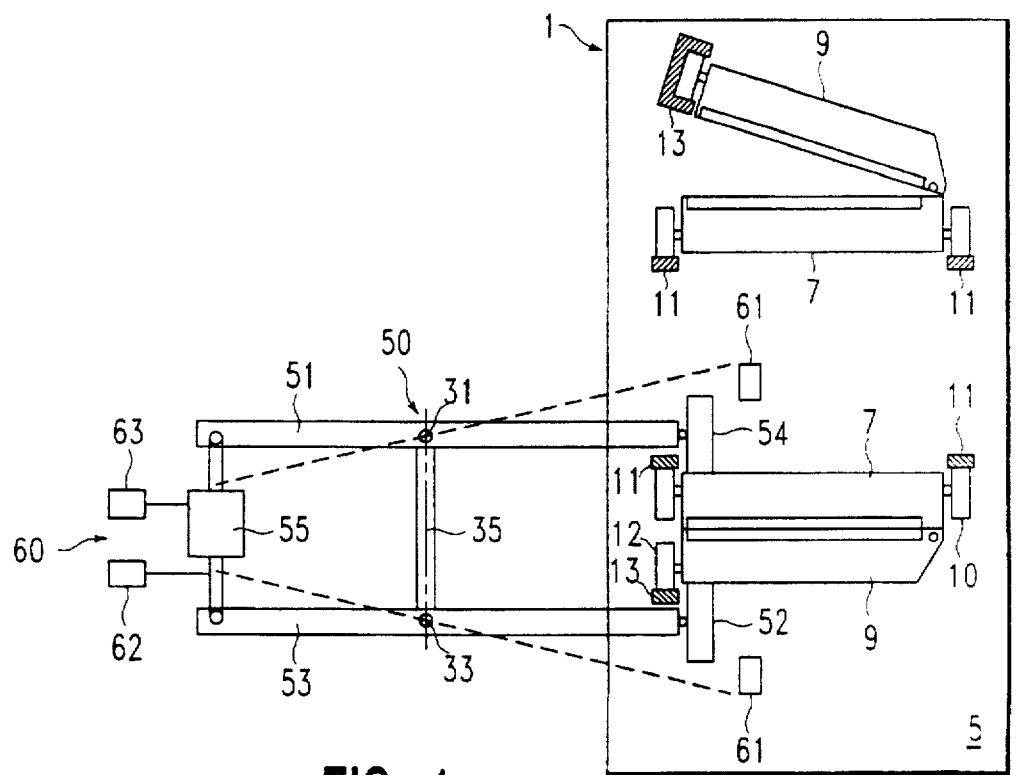
FIG. 4 diagrammatically shows, in cross section, taken on the line IV–IV in FIG. 1, a removal station with a baking mold.

Referring in particular to FIGS. 2 and 3, the structure and the operation of the closing station 3 are further described.

Arranged in the closing station 3 is a closing actuator 30 by which the mold sections 7 and 9, active controlled, can be moved relative to each other in the closing direction. The closing actuator 30 comprises an upper lever 32 rotatable about a first point of rotation 31 and a lower lever 34 rotatable about a second point of rotation 33. The points of rotation 31, 33 are interconnected by a rod 35 which is connected to the oven 1. The levers 32, 34 extend substantially parallel to each other, transversely to the direction of travel of the baking molds 2. Mounted on the upper lever at one end 36 thereof is a pressure roller 37, which is bearing-mounted on a pin extending substantially parallel to the upper lever 32. On the lower lever at one end 38 thereof are mounted two support rollers 39, side by side and spaced apart, each bearing-mounted on a pin extending substantially parallel to the lower lever 34. The pressure roller 37 and the support rollers 39 lie substantially in one plane. While the pressure roller 37 is arranged halfway between the two support rollers 39, the support rollers 39 extend substantially under the track rails 11 and the pressure roller 37 is situated substantially at a distance above the track rails 11.

The ends 40, 41 of the upper lever 32 and the lower lever 34, respectively, located on the side of the points of rotation 31, 33 remote from the rollers 37, 39, are connected with each other by a force transmission device 42. By the use of the force transmission device 42, the pressure roller 37 and the support rollers 39 can be moved relative to each other in a direction approximately at right angles to the axes of rotation of the rollers, between a first, open position (indicated in the drawing by dotted lines) and a second, closed position (shown in solid lines in the drawing).

During use of the oven 1 the levers are brought into the open position, before an opened baking mold is fed into the closing station 3. Then a baking mold 2 is placed between the pressure rollers 37 and the support rollers 39, and the levers 32, 34 are moved into the closed position by energization of the force transmission device 42. The pressure roller 37 is thereby moved against the upper side of the second mold section 9 and the support rollers 39 are moved against the lower side of the first mold section 7. The first mold section is then preferably lifted to some extent, whereby the runners 10 on the side of the actuator 30 are taken off the track rail 11. The pressure roller 37 is moved further down in the direction of the support rollers 39 with a dosed force, whereby the mold sections are fully pressed against each other. Then the locking pin 17 is rotated into the second position (FIG. 6), so that the baking mold 2 is locked.

For the purpose of rotating the locking pin 17, a fixed stop 43 is placed in the path of travel of the cross 18 in the closing station 3 (FIG. 6). Upon forward movement of the baking mold 2, the cross 18 is moved by the first leg 20 thereof against the stop 43. Because the stop 43 is fixedly arranged at least in a direction of travel P of the baking mold 2, the locking pin 17 will be rotated upon movement of the baking mold, in such a manner that the first leg 20 will extend parallel to the path of travel of the baking mold 2 and the second leg 19 perpendicularly thereto. The locking pin 17 is thus brought into the locking position.

After locking the baking mold 2, the levers 32, 34 are moved back into the open position, whereby the pressure roller 37 and the support rollers 39 are moved away from the baking molds, the runners 10 are placed back onto the track rail 11 and the baking mold 2 can be guided through the baking zone 4 in closed and locked condition.

After baking the products in the baking zone 4, the baking mold 2 is passed into the removal station 5, where the baking mold 2 is opened and the baked products are removed from the baking forms. Then the baking mold, in open condition, is passed further to the filling station 6, and a next baking cycle is commenced.

Referring to FIG. 4, for opening the baking mold, an opening actuator 50 is arranged in the removal station, by which the mold sections 7 and 9, actively controlled, can be moved relative to each other in the closing and opening direction. In structure, the opening actuator 50 is comparable with the closing actuator 30 but is turned upside down with respect to it. In the opening actuator 50, an upper lever 51 comprises the two support rollers 54, while a lower lever 53 comprises the pressure roller 52. Before the baking mold is fed into the removal station 5, the levers 51, 53 are brought into the opened position by means of a force transmission device 55 arranged between the ends of the levers 51, 53 remote from the rollers 52, 54. The baking mold is then moved freely between the rollers 52, 54, that is, without the rollers 52, 54 applying pressure to the mold sections 7, 9. Then the levers 51, 53 are brought into a closed position, whereby the pressure roller 52 at the underside comes to lie against the second mold section 9 and simultaneously the support rollers 54 at the top come to lie against the first mold section 7. The support rollers 54 and the pressure roller 52 are then moved further towards each other by means of the force transmission device 55, whereby the mold sections 7, 9 come to lie fully against each other and the locking face 22 of the locking pin 17 comes clear of the second flange 16. Arranged in the path of travel of the cross 18 of the locking pin 17 is a second stop, not shown in the drawing, comparable to the first stop 43, which, upon forward movement of the baking mold 2, rotates the locking pin 17 by a quarter turn, from the second position to the first position, in a manner comparable but opposite to the method of locking shown in FIG. 6.

During the unlocking of the baking mold 2, the pressure roller 52 and the support rollers 54 continue to abut against the relevant mold section 9, 7, so that the baking mold is maintained in the closed condition. Only after rotation of the locking pin 17 are the levers 51, 53, under active control, moved back gradually to the opened condition, so that the movement of the mold sections relative to each other and to the track rails 11 and the guide rail 13 occurs fluently and without extreme (shock) loads. This prevents the baking mold from springing open and hence damage to the baking mold, the oven and the products.

In the foregoing, a travelling-tray oven 1 has been described during normal use. However, before the baking of the products, the oven 1 and the baking molds 2 are to be heated. It is then particularly advantageous when the baking molds, in a method according to the invention, are preheated in the oven before baking, whereby the baking molds are closed and locked only once and are then circulated through the oven a number of times in closed condition. As a result, the different mold sections, the oven and the different operating means such as the actuators are subject to lesser loads, and which vary to a lesser extent, so that their life is considerably prolonged.

To pass the baking molds a number of times through the oven without the baking molds being intermediately opened and closed, in an embodiment of an oven according to the invention, shown in particular in FIGS. 5 and 6, the guide rail 13 between the removal station 5 and the closing station 3 comprises a first section 13', constituting an outside bend, and a second section 13", constituting an inside bend, while the actuators 30, 50 and the stops 43, 56 are movable out of the path of travel of the baking mold 2. During the heating up of the baking molds 2 and the oven 1, the oven 1 is used as follows.

The baking molds 2 are passed into the closing station 3 one by one, the baking molds 2 being closed and locked in the conventional manner. The opening actuator 50 is brought into the opened position and fixed therein, while the stop (not shown) in the removal station 5 is pulled away out of the path of travel of the locking pins 17. The guide rail in the removal station 5 includes a switch 57 which can connect the section of the guide rail 13 that extends through the baking zone 4 of the oven with the outside bend 13' or with the inside bend 13", as desired. During heat-up, the switch 57 is set such that the guide roller 12 is passed through the inside bend 13".

After the last opened baking mold 2 has been passed through the closing station 3, and has been closed and locked there, the closing actuator 30 is also brought into the opened position and maintained therein, and the associated stop 43 is brought outside the path of movement of the locking pins 17. In the closing station 3, the guide rail 13 likewise comprises a switch 58, between the section of the guide rail that extends through the baking zone 4, the outside bend 133 and the inside bend 13". During heat-up of the baking molds 2, this switch 58, of course, is set such that the inside bend 13" is connected to the remainder of the guide rail 13.

After the baking molds 2 have heated up, the stops 43, 56 are moved back into the path of movement of the locking pins 17, the actuators 30, 50 are released again and the switches 57, 58 are set such that the outside bend 13' is connected to the guide rail 13, so that the baking molds 2 for baking products can be normally used.

The baking molds may also be circulated through the oven a number of times during heating while in unlocked condition, analogously to the above-described manner. This provides advantages in particular in the case of baking molds where the difference between the closing tension in cold condition and the closing tension in hot condition (of use) is large.

In the embodiment of an actuator 30, 50 according to the invention as shown in particular in FIGS. 3, 4 and 6, control means 60 are arranged for controlling the movements of the pressure roller 37, 52 relative to the support rollers 39, 54. These control means 60 comprise at least location detection means 61, position detection means 62, the force transmission device 42, 55 and force detection means 63. The force transmission device 42, 55 is preferably an air cylinder or like device, since it has the advantage that a good buffer action is thereby obtained, while the force transmission device is simply, quickly and accurately operable and controllable and relatively inexpensive.

With such an actuator 30, 50, the movements of mold sections 7, 9 relative to each other can be actively controlled as follows.

The location detection means 61 comprise a first signal generator 61' which supplies a signal at the time when baking mold 2 is located in a desired position between pressure roller 37, 52 and the support rollers 39, 54. As long as this signal is not produced, the force transmission device 42, 55 is controlled by the position detection means 62, such that the relevant levers 32, 34; 51, 53 are brought into the open position. As soon as the baking mold 2 has been brought into the desired position and the first signal generator 61' has produced the desired signal, the force transmission device 42, 55 is actuated and the relevant levers 32, 34; 51, 53 are brought into the closed condition. The force transmission detection means 63 are arranged so that they measure the force which is exerted by the pressure roller 37, 52 and the support rollers 39, 54 on the mold sections 9, 7. By means of the force detection means 63, a closing force can be set which must be achieved for closing the baking mold. When this closing force is achieved, the baking mold 2 is locked or unlocked.

In addition, with the force detection means 63, at least at the closing control 30, a maximum closing force can be set. If this maximum closing force is exceeded, the force detection means 63 produce an emergency signal, so that the stop 43 arranged at the relevant closing actuator 30 is moved out of the path of movement of the locking pin 17 of the relevant baking mold, for instance by pulling the stop 43 away in downward direction. This prevents the locking pin, the baking mold and/or the stop from being damaged if the baking mold cannot be closed with a force less than the set maximum closing force. This may, for instance, occur when soiling has arisen between the land areas of the baking mold or in case the baking mold has not been emptied (completely) in the removal station but thereafter has nevertheless been provided with a new amount of dough.

The fact that the guide roller 12 is accommodated in the guide rail 13, 13', 13" prevents an unlocked baking mold from falling open in the oven. Since the actuators 30, 50 can be brought into an opened position, there is moreover no danger of an unlocked baking mold jamming in the oven. In fact, the pressure roller 37, 52 and support rollers 39, 54 of an actuator 30, 50 can be moved apart such that a slightly open baking mold can also be moved between them. Accordingly, an unlocked baking mold can still be emptied in a next baking cycle, be filled again, closed and locked without requiring that the oven be brought to a halt first and be cooled to be able to perform repairs and/or cleaning operations.

On the side of the actuator 30, 50, which is the rear side when viewed in the direction of supply of the baking molds, a second signal generator 61" is positioned. As soon as the baking mold has passed this signal generator 61", a second signal is produced, so that the force transmission device 42, 55 is actuated and the levers 32, 34; 51, 53 are driven into the open position. At the closing actuator 30, this movement towards the opened position can be performed relatively quickly and independently; at the opening actuator 50, this movement is controlled, inter alia, by the force detection means 63 and the force transmission device 55.

When the opening control 50 is being driven into the open position, at least over a part of the opening path, a force of the pressure rollers 52 on the second mold section 9 is maintained by the force detection means 63. The second mold section 9 hinging away from the first mold section 7 is to some extent held up by the pressure roller 52, so that the speed of movement of this mold section 9 is decelerated. This is of particular importance, notably in the case of molds which are used for baking products from, for instance, aqueous suspensions such as dough prepared on the basis of starch, whereby as a result of steam evolvement in the baking mold a large pressure is built up between the mold sections, and in the case of baking molds which are closed with a bias. The pressure built up and the bias could lead to substantial wear and damage if the baking molds were opened unchecked and uncontrolled, as in the known methods.

The levers 32, 34; 51, 53 largely extend outside the casing of the oven 1, so that cooling of these parts, and in particular of the energization device and of the different points of rotation, can at least substantially be omitted. Moreover, the pressure roller 37, 52 and the support rollers 39, 54 of the actuators 30, 50 are preferably air or water cooled, so that a long life of the different bearings of the rollers is enhanced.

The actuators 30, 50 each constitute a closed-force system, which means that the actuators 30, 50 transmit no or only small forces to the different parts of the oven 1. The forces are at least substantially absorbed by the connecting rod 35 between the points of rotation 31, 33 of the levers 32, 34; 51, 53, by the force transmission device 42, 55 and by the baking mold 2. As a consequence, no special provisions need to be made on the oven 1, such as for instance stiffening provisions for the casing, the track rails 11 or the guide rail 13, 13', or 13". An actuator 30, 50 according to the invention moreover substantially absorbs the forces to be transmitted to the baking mold for closing and opening it, so that loads on the runners 10 and the guide roller 12 are kept to a minimum and hence the life of the runners 10 and of the guide roller 12 is prolonged. In addition, the bearings for the runners 10 and the guide roller 12 can be of simple and light design.

In the drawing, in the oven 1, baking molds of the same kind are shown. In an oven according to the invention, however, it is possible to simultaneously pass baking molds of different kinds through the oven. Differences in the thicknesses of molds among themselves, any deviations in size and differences in the desired closing force can be simply accommodated with the actuators 30, 50 according to the invention by adjusting the settings and in that use is made of the location detection means 61, the position detection means 62, the force detection means 63 and the force transmission means 42, 55. It is here preferred that means are arranged which can recognize a baking mold presented at an actuator 30, 50 by kind. On the basis of the kind of baking mold 2 and the signals produced by the different detection means 61, 62, 63, an actuator signal suitable for the energization of the actuator 30, 50 can be supplied to the force transmission device 42, 55.

The invention is in no way limited to the embodiments described. Many adaptations are possible within the concept of the invention. For instance, the stops 43, 56 for operating the locking pins 17 can be fixedly connected with an arm of the relevant control 30, 50 and it may be possible for the actuators 30, 50 to be pulled clear of the path of movement of the baking molds 2, such that the relevant stop 43, 56 is also moved out of the path of the locking pin.

Further, for instance, only one of the levers of an actuator may be rotatably arranged, rather than both, and the force transmission device can connect the levers of an actuator at positions located between the points of rotation and the pressure roller and support rollers, respectively. Moreover, the pressure roller and the support rollers of an actuator can be moved relative to each other in a different manner than by means of levers, for instance by means of pistons, and a different number of rollers can be used. The baking molds can be provided with all sorts of different kinds of locking means and with mold sections moving relative to each other in different ways, and the baking molds can be circulated in different ways through different kinds of ovens, for instance through a circular oven.

We claim:

1. A method for manufacturing products in a series of baking molds to be passed through an oven, which baking molds comprise at least two baking sections movable relative to each other, wherein in a baking cycle the baking mold is successively opened, filled, closed and locked in a closing station, guided along a number of guideways extending through the oven, and opened and emptied in a removal station, the method comprising steps of:

(a) controlling at least a part of the movements of the two baking sections relative to each other by actuator means which are movable relative to each other in response to control signals, such that during an opening and closing of the baking molds, a weight of the baking mold and an opening pressure of the baking mold are substantially borne by the actuator means; and (b) transmitting a force directed in a closing direction to the two baking sections to thereby control the movements of the baking sections relative to each other.

2. A method according to claim 1, wherein the step of controlling includes sub-steps of i) moving closing pressure means and closure support means of the actuator, relative to each other, before the baking mold is introduced into the closing station, into a first position, ii) passing the baking mold between the closing pressure means and closure support means without a closing force being exerted on the baking mold, iii) moving the closing pressure means and the closure support means relative to each other into a second position, whereby the closing pressure means exert a closing force on the baking mold such that the baking mold is closed, and iv) locking the baking mold such that the two baking sections are fixed relative to each other.

3. A method according to claim 2, wherein the step of controlling includes a further sub-step of v) moving, after the sub-step of locking the baking mold, and before the baking mold is guided from the closing station, the closing pressure means and the closure support means back in the direction of the first position.

4. A method according to claim 1, further comprising a step of c) opening a baking mold, the step of opening including sub-steps of i) moving removal pressure means and removal support means of the activator means relative to each other into a first position before the baking mold is introduced into the removal station, ii) passing the baking mold between the removal pressure means and the removal support means without the removal pressure means exerting a pressure force on the baking mold, iii) moving the removal pressure means and the removal support means relative to each other into a second position in which the removal pressure means exert a pressure force on the baking mold in the closing direction, iv) unlocking the baking mold v) moving the removal pressure means and the removal support means back relative to each other in the direction of the second position, whereby the removal pressure means exert a pressure force on the baking mold in the closing direction which is smaller than the force which is exerted on the baking sections in the direction opposite to the closing direction.

5. A method according to claim 1, wherein the step of controlling includes further sub-steps of i) taking away at least a part of the baking mold from the guideway, and ii) supporting the baking mold, during the movement of the baking sections relative to each other, such that the force produced by the actuator means is at least substantially absorbed by the actuator means.

6. A method according to claim 2, wherein, in the sub-step of moving the pressure means relative to the support means, a direction of the relative motion extends substantially at right angles to the guideways.

7. A method according to claim 1, further comprising a step of:

c) pre-heating the baking molds, before being used for baking the moldings, in the oven, wherein, during the step of pre-heating, the baking molds are closed and then passed through the oven a number of times in succession, without the baking molds being opened.

8. A method according to claim 7, wherein the step of pre-heating the baking molds includes a sub-step of moving the actuator means out of the path of travel of the baking molds.

9. An oven comprising:

a) a series of baking molds to be passed in succession through the oven, each baking mold comprising a first and a second mold section, the first mold section comprising guide means by means of which the baking mold can be guided along a number of guideways extending through the oven;

b) a closing station comprising i) actuator means for pressing on the mold sections in the closing direction, and ii) locking means and lock operating means arranged for locking and unlocking the baking mold, wherein the actuator means comprise a first actuator comprising closing pressure means and closure support means movable relative to each other between a first position wherein the baking mold can be moved substantially freely between and through the closing pressure means and the closure support means, and a second position wherein the baking mold in the closed condition, before the locking of the baking mold, is or can be brought into contact, under a closing bias, simultaneously with the closing pressure means and the closure support means;

c) a removal station; and d) a baking zone.

10. An oven according to claim 9, wherein the actuator means further comprise

A) a second actuator comprising
   1) removal pressure means, and
   2) removal support means, wherein the removal pressure means and the removal support means are movable relative to each other between a first position wherein the baking mold can be moved substantially freely between and through the removal pressure means and the removal support means, and a second position wherein the baking mold in closed condition, before being unlocked, is or can be brought into contact simultaneously with the removal pressure means and removal support means, biassed in a closing direction, and wherein the removal station includes means for the controlled opening of the baking mold after the unlocking.

11. An oven according to claim 10, wherein the removal support means and the removal pressure means comprise a number of rollers, and wherein, in the second position of the removal pressure means and removal support means, at least one first roller has a running surface abutting the first mold section and at least one second roller has a running surface abutting the second mold section, such that the rollers transmit a force appropriate for passing on the baking mold to a path where the unlocking means are arranged.

12. An oven according to claim 9, wherein the closing pressure means and the closure support means comprise a number of rollers, and wherein, in the second position of the closing pressure means and closure support means, at least one first roller has a running surface abutting the first mold section and at least one second roller has a running surface abutting the second mold section, such that the force appropriate for closing the baking mold is transmitted to a path where the lock operating means are arranged.

13. An oven according to claim 11, wherein each first roller is mounted on a first lever and each second roller is mounted on a second lever, at least one of the first and second levers being arranged for movement relative to the other of the first and second levers, the oven further comprising a force transmission device, arranged between the levers, for moving at least one of the first and second levers, such that the distance between the relevant first and second rollers is adjustable.

14. An oven according to claim 13, wherein the force transmission device is adapted to produce an adjustable force.

15. An oven according to claim 14, wherein the force transmission device comprises an air cylinder.

16. An oven according to claim 10, wherein the actuators each form a closed-force assembly.

17. An oven according to claim 10 further comprising a casing surrounding the baking zone of the oven, wherein the actuators extend partly outside the casing.

18. An oven according to claim 11, wherein the rollers comprise cooled bearings.

19. An oven according to claim 11, wherein at least the actuators and the lock operating means are movable out of the path of movement of the baking mold such that the baking molds, in closed condition, can be circulated through the oven more than once while remaining closed.

20. An oven according to claim 11, wherein the oven further comprises a guide rail extending at least through the closing station, the removal station and the baking zone, wherein each second mold section comprises a guide means adapted to cooperate with the guide rail, and wherein at least the part of the guide rail extending in the removal station can be brought out of contact of the guide means.

21. An oven according to claim 20, wherein the part of the guide rail extending in the closing station can be brought out of contact of the guide means, independently of the part of the guide rail extending in the removal station.

22. An oven according to claim 20, wherein the guide rail includes switches for bringing relevant parts of the guide rail out of contact of the guide means.

23. An actuator for use for controlling movements of mold sections relative to each other in a continuous oven, the actuator comprising:

a) at least one pressure roller, and at least one support roller, wherein the support roller and the pressure roller are arranged vertically with respect to each other and have approximately parallel axes of rotation and are movable relative to each other in a direction approximately at right angles to the axes of rotation; and c) control means comprising
   i) location detection means being arranged for determining the position of a baking mold relative to the actuator,
   ii) position detection means being arranged for determining the position of the pressure roller relative to the support roller,
   iii) a force transmission device being arranged for the controlled movement of the pressure roller and the support roller relative to each other, and
   iv) force detection means being arranged for determining the magnitude of the forces which are transmitted by the actuator to the baking mold.

24. The oven of claim 9 wherein the first and second mold sections of each baking mold are hingedly connected.

25. The oven of claim 9 wherein the actuator means include

A) a first pivotable lever having a roller which may be brought into abutment with the first mold section, and B) a second pivotable lever having a roller which may be brought into abutment with the second mold section.

26. The oven of claim 9 wherein the removal station includes actuator means for opening the first and second mold sections of the mold, and wherein the actuator means of the removal station maintains a force on the first and second mold sections during an opening of a mold.

* * * * *